UNITED STATES PATENT OFFICE.

ADOLF THEODOR BÖHME, OF DRESDEN, SAXONY, GERMANY.

PROCESS OF MAKING COLORING-MATTER.

SPECIFICATION forming part of Letters Patent No. 329,125, dated October 27, 1885.

Application filed April 29, 1884. Serial No. 129,769. (No specimens.)

*To all whom it may concern:*

Be it known that I, ADOLF THEODOR BÖHME, of Dresden, Saxony, Germany, have invented certain new and useful improvements in the manufacture of mordants and coloring-matters from glucosides, tannin, and bitter principles, of which the following is a full and complete specification.

This invention relates to the preparation of derivatives from glucosides, tannins, and bitter principles in the form of coloring-matters, and to the utilization of such derivatives either as fast coloring-matters or simultaneously as coloring-matters and mordants, the object of this invention being to considerably shorten and simplify the method of dyeing as heretofore employed. The three intimately-connected groups of tannins, glucosides, and bitter principles have not in the present state of science been yet definitely determined. These substances have this in common, that they form homologous compounds with the chemical agents employed in the manufacture hereinafter described. The higher the degree of oxidation of the above-mentioned derivations is, the more suitable they are as coloring-matters, which can be employed without mordants for dyeing animal and vegetable fibers, while when these substances have only a low degree of oxidation, they can be suitably and simultaneously used as coloring-matters and mordants.

It is obvious that with the immense number of glucosides, tannins, and bitter principles present in the animal and vegetable kingdom and capable of being, according to the hereinafter-described process, converted into coloring-matters and mordants, there may, according to the oxidizing, reducing, or acid agents employed, and to the different proportions in weight of the substances used, and also according to the various temperatures employed in the process, be formed dyes of numerous shades of color and various properties. All these preparations contain a crude material in common, which, whether nitrogenous or not, is extracted from different plants or animal products and belongs to the glucosides, tannins, or bitter principles. A common feature of the said preparations is that they are produced by the action of chemicals which either decompose, with formation of sugar, their crude material (or separate its elements) and form salts with one part of the products of decomposition, or serve as weak or strong oxidizing means, and more or less oxidize (with abundant formation of sugar) the said crude material, whereby its original nature is entirely or to a great extent altered, this action taking place mostly with a complex formation of salts. The properties of these compounds are of the greatest importance in tinctorial industry. The said compounds are soluble in water, (thus perfectly and very characteristically differing from lac and printing dyes,) and are not only precipitated from their solutions by alkaline liquors, but they separate whenever spun or woven fabrics composed of animal or vegetable fibers (especially vegetable) are introduced in the diluted solutions (dye-bath) of such compounds without the use of mordants being required, and deposit upon such fabrics, (coloring the cellulose,) from which they cannot afterward be removed either by cold or boiling water.

I will now proceed to describe, by way of example, a process of preparation according to which can be produced the derivatives of glucoside, bitter principle, and tannin in the form of suitable products for dyeing purposes, these products forming a fast dye without the employment of mordants, for they act simultaneously as a dye and as a mordant. This example will also show how many deviations from the process can be resorted to in order to obtain various shades of color without departing from the nature of the said invention. When it is desired to prepare a direct fast coloring-dye of a reddish-violet color, I proceed as follows: Twenty kilos of extract of Brazilian wood are dissolved in boiling water, to which is added a little nitric or hydrochloric acid, in order to precipitate the resin. The braziline, which is in solution and rises to the top of the liquor, is removed. Then five kilograms of permanganate of potash are dissolved in water, this solution being added to that of the braziline under constant and slow agitation. The resulting precipitate is filtered off and lixiviated. It is then treated with acids (nitric, hydrochloric, sulphuric, or oxalic acids) until dissolved. Then it is boiled, if necessary. After cooling, the liquor is continuously neutralized with acetate or carbonate of ammonia. The reddish coloring-matter thus obtained would have essentially different properties and a different appearance if the liquid had not been filtered from the precipitate, obtained by means of permanganate of potash, and if the unfiltered mass had been treated as above and then concentrated in a vacuum or in the open air. The coloring-matter has the consistency of a paste and is then ready for the market.

The above-mentioned difference in the properties of the coloring-matters exhibits itself in their yield, their brightness, their shade, the energy and regularity of their dyeing power, and their being alterable or unalterable at a dry heat.

It is a matter of indifference whether the coloring-matter is prepared with five kilos of permanganate of potash, with less or more of that substance, or partly with chromate of potash, or altogether with the latter, or with chlorate of potash and hausmannite, or pyrolusite, (manganese ores,) or with chrome-alum, or chrome-acetate and nitrous acid, or with one or several of the above or similar substances, as the chief properties (its chemical action or fibers) of the resulting coloring-matter will always be the same. Generally the colors are brighter, but not so fast when they are slightly or not at all oxidized, (or even reduced,) and the operations are then limited to the formation of salts with chromium, tin, manganese, and the like. In this case the coloring-matter partakes also of the nature of a mordant, in so far as when it is mixed with aniline colors it fixes the latter upon vegetable cellulose without requiring the usual mordants. By the introduction or interchange of other chemical substances—such as sulphur, mercury, arsenic, and the like—further dye products may be produced.

In a similar manner to that above described yellow and greenish colors may be obtained from frangulin, maclurin, euxanthic acid, quercitrin, while orange colors will be produced from curcumin, munjistin, and bluish and gray colors from hæmatoxylin. Further, red and violet colors may be obtained from vubiretic acid, santalin, hæmatëin, carthamin, and brown colors from catechin, castanein, and the like. All these coloring-matters have the property (not hitherto known) of fixing themselves directly upon animal or vegetable fibers, so that there is no need to employ several baths in order, for instance, to fix catechin or quercitrin upon the fibers.

Having now particularly described and ascertained the nature of the said invention in what manner the same is to be performed, I declare that what I claim is—

The process of making coloring-matters, which consists in boiling glucosides derived from quercitrin, horse-chestnut, Brazilian wood, or the like, in water mixed with nitric or hydrochloric acid to precipitate the resin, then removing the braziline or the like, and treating it with a solution of permanganate of potash, then filtering and lixiviating the resulting precipitate, then treating the same with acid, then cooling and neutralizing the solution, all as and for the purposes set forth.

In testimony whereof I have hereunto set my hand, this 26th day of March, 1884, in the presence of two subscribing witnesses.

ADOLF THEODOR BÖHME.

Witnesses:
WILHELM WIESENHÜTER,
MARTIN KÖRNER.